No. 886,223.
PATENTED APR. 28, 1908.
H. C. KRASE & R. GRIMM.
STRAW OR FEED CUTTER.
APPLICATION FILED AUG. 28, 1907.
2 SHEETS—SHEET 2.
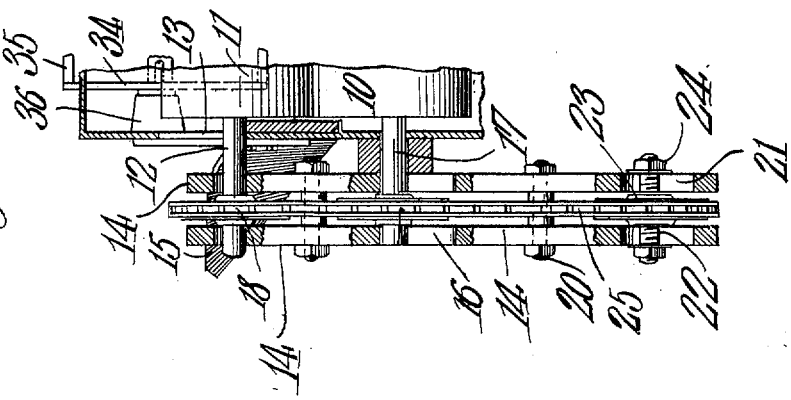
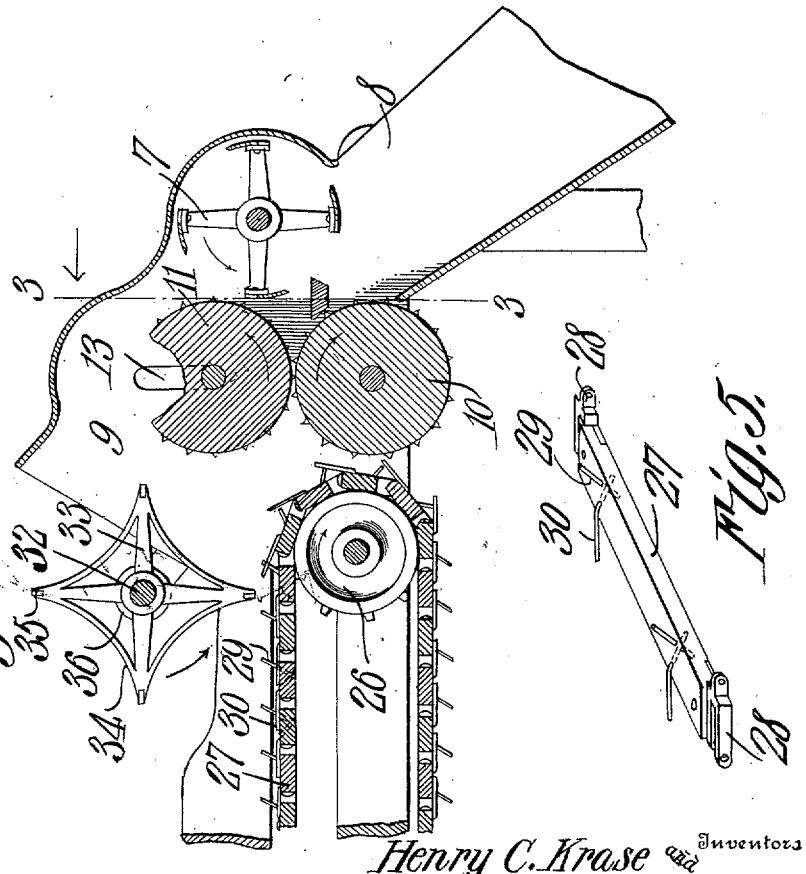
Witnesses
Henry C. Krase
Richard Grimm. *Inventors*
By C. A. Snow & Co.
*Attorneys*

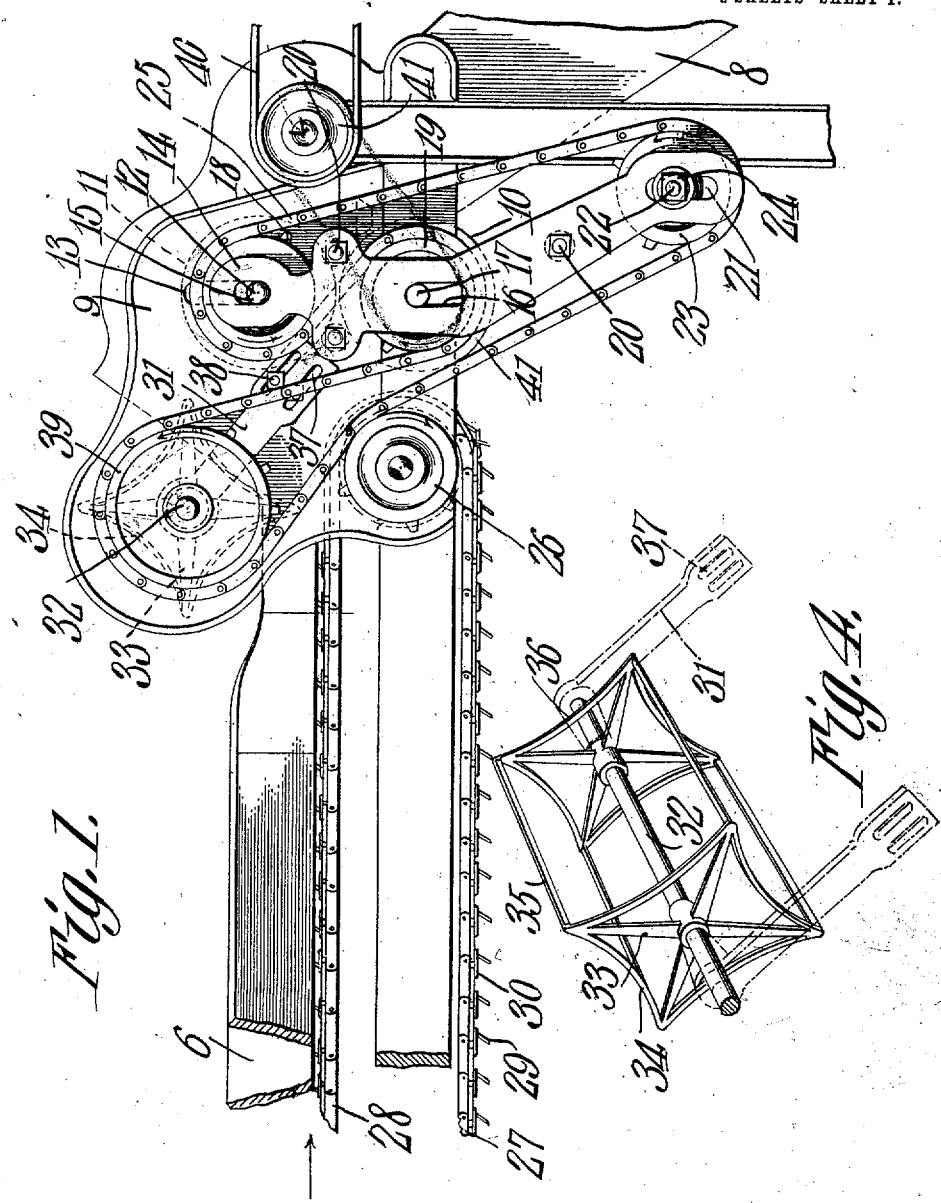

UNITED STATES PATENT OFFICE.

HENRY C. KRASE AND RICHARD GRIMM, OF TWO RIVERS, WISCONSIN.

STRAW OR FEED CUTTER.

No. 886,223.     Specification of Letters Patent.     Patented April 28, 1908.

Application filed August 28, 1907. Serial No. 390,507.

*To all whom it may concern:*

Be it known that we, HENRY C. KRASE and RICHARD GRIMM, citizens of the United States, residing at Two Rivers, in the county of Manitowoc and State of Wisconsin, have invented a new and useful Straw or Feed Cutter, of which the following is a specification.

This invention relates to feed cutters and has for its object to provide a strong, durable and thoroughly efficient machine of this character in which the straw or other material is positively and uniformly fed to the cutting knives.

A further object of the invention is to provide a reel mounted for rotation in advance of the feed rollers and adapted to partially compress the hay or other material and positively feed the same to said rollers.

A further object is to provide an endless belt or conveyer the slats of which are provided with pulling and stripping teeth which co-act with the reel or drum for feeding the material to the rollers.

A further object is to arrange the stripping teeth on one of the conveyer slats in contact with the pulling teeth of an adjacent slat so that as the conveyer travels around the sprocket wheels the stripping teeth will disengage the hay or other material from said pulling teeth.

A further object is to provide improved means for mounting the feed rollers, and means for regulating the tension of the sprocket chain connected with said rollers.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a side elevation of a feed cutter constructed in accordance with our invention. Fig. 2 is a longitudinal sectional view of the same. Fig. 3 is a detail transverse sectional view taken on the line 3—3 of Fig. 2 and looking in the direction of the arrow. Fig. 4 is a perspective view of the reel detached. Fig. 5 is a perspective view of one of the slats of the conveyer detached.

Similar numerals of reference indicate corresponding parts in all of the figures of the drawings.

The improved machine forming the subject matter of the present invention includes a supporting frame provided with a horizontally disposed hopper or trough 6 and having a cutter 7 of any approved construction mounted for rotation between the side walls of the frame above the discharge chute 8, as shown.

Journaled in suitable bearings in the side walls of the supporting frame 9 is a relatively stationary feed roller 10 and arranged above the stationary feed roller and disposed in vertical alinement therewith is a movable feed roller 11. The movable feed roller 11 is provided with oppositely disposed trunnions or stub shafts 12 which extend through vertically disposed slots 13 formed in the side walls 9 of the frame.

Disposed parallel with one of the side walls 9 of the frame are spaced bars 14 having transversely alined slots 15 and 16 formed therein for the reception of the stub shafts 12 and 17 of the upper and lower feed rollers, there being sprocket wheels 18 and 19 secured to said stub shafts and interposed between the bars 14, as shown. The bars 14 are maintained in spaced relation by means of bolts or similar fastening devices 20 while the lower ends of said bars are deflected laterally and provided with terminal slots 21 in which is seated a stub shaft 22 carrying an idle sprocket 23. The opposite ends of the stub shaft 22 are threaded for engagement with suitable clamping nuts 24 so that by adjusting the sprocket wheels 23 vertically of the slots 21 and rotating the nuts 24 the tension of the sprocket chain 25 may be regulated at will. It will thus be seen that the upper roller 11 is free to move vertically with respect to the lower roller 10 to permit the passage of hay or other material fed to the cutter 7. As the stub shafts 12 of the upper roller slide vertically within the slots 13 a corresponding movement will be imparted to the spaced bars 14, the slots 16 permitting free vertical movement of the bars without effecting the lower feed roller 10. The upper slots 15 are of less length than the lower slots 16 and are designed to permit tilting movement of one end of the upper roller without effecting the movement of the bars 14.

Mounted for rotation on sprocket wheels 26 is an endless belt or conveyer preferably formed of a plurality of transverse slats 27 secured in any suitable manner to the links 28 of the sprocket chains, which latter engage the sprocket wheels 26, as shown. The slats 27 are each provided with a plurality of pulling teeth 29 preferably inclined towards the feed rollers and adapted to engage and force the hay or other material to said rollers when the conveyer is operated. The slats 27 are also provided with rearwardly extending stripping teeth 30 the function of which is to strip or disengage the material from the pulling teeth 29 as the conveyer travels around the sprocket wheel 26.

Attention is here called to the fact that the stripping tooth 30 of one conveyer slat is disposed in contact with the pulling tooth of an adjacent slat so that as the slats are successively tilted in their passage around the sprocket wheel 26, said stripping teeth will effectually disengage any particles of hay or other material adhering to or lodged against the pulling teeth 29.

Secured to the opposite side walls of the supporting frame 9 are spaced brackets or hangers 31 in the free ends of which is journaled the shaft 32 of a revolving reel. The reel includes spaced heads each formed of a plurality of radiating spokes 33 connected by concaved braces 34 preferably formed integral with the spokes 33. The opposite heads of the reel are connected by longitudinal bars 35 which are secured to the opposite heads of the reel at the juncture of the brace 34 with the spokes 33. The concaved braces 34 serve to prevent hay or other material from winding around the shaft 32 and clogging or otherwise obstructing the movement of the reel, while the longitudinal projecting bars 35 serve to force the loose hay or other material against the endless conveyer and partially compress said material before the latter is fed to the feed rollers.

The opposite heads of the reel are preferably spaced a short distance inwardly from the side walls 9 of the frame; and secured to or formed integral with the brackets 31 and interposed between the heads of the reel and said brackets are stationary conical members 36 which form bearings for the shaft 32 and also prevent the material from coiling around the opposite ends of the reel or drum. The brackets 31 are provided with elongated slots 37 by means of which the reel or drum may be adjusted either laterally or vertically with respect to the endless conveyer or table, said brackets being secured in adjusted position by bolts or similar fastening devices 38 which extend through the slots 37 and engage the side walls of the supporting frame, as shown.

Keyed or otherwise rigidly secured to one end of the shaft 32 is a sprocket wheel 39 which engages the sprocket chain 35, the latter being passed over the sprocket wheels 18, 19 and 26 and also over the loose sprocket wheel 23 so that motion may be simultaneously imparted to the reel, feed rollers and endless conveyer.

Motion is transmitted to the machine through the medium of a belt 40 which engages a wheel or pulley 41 secured to the shaft of the cutter 7 so that when the belt 40 is operated motion will be imparted to the chain 25 to effect the rotation of the reel, roller and endless belt, the cutter shaft being connected with the lower feed roller by suitable gearing, (not shown).

In practice the operator spreads the cornstalks, hay, straw or other material on the endless conveyer with a fork or other suitable tool. As the endless belt or conveyer rotates the pushing teeth 29 will engage the material and force the same in the direction of the revolving reel, which latter will engage the material and partially compress the same. As the slats 27 travel around the sprocket wheel 26 they are successively tilted so as to cause the stripping teeth 30 of one slat to disengage the material from the pulling teeth of the succeeding slat, the reel at the same time positively forcing the material through the feed rollers to the cutter, in the manner before stated.

In order to take up any slack in the sprocket chain 25 it is merely necessary to release the clamping nut 24 and adjust the sprocket wheel 23 vertically of the slot 21, as will be readily understood.

While the endless conveyer and reel are principally designed for use in connection with feed cutters it is obvious that the same may be used in connection with other kinds of machinery without departing from the spirit of the invention.

Having thus described the invention what is claimed is:

1. A feed cutter including a frame, an endless conveyer mounted for rotation on the frame, feed rollers disposed at one end of the conveyer, a cutter, brackets secured to the frame above the conveyer, a shaft journaled in said brackets, spaced heads secured to the shaft and formed of intersecting spokes connected by integral concaved braces, longitudinal bars connecting the heads at the intersection of the concaved braces, said heads and connecting bars constituting a reel for feeding the material between the rollers to the cutter.

2. A feed cutter including a frame, an endless conveyer mounted for rotation on the frame, rollers disposed at one end of the conveyer, a cutter, brackets secured to the frame, a shaft journaled in the brackets, a reel carried by the shaft and including spaced heads formed of radiating spokes connected by concaved braces, longitudinal bars connecting the heads at the juncture of the adjacent concaved braces and forming a part of the reel, and members secured to the brackets and forming journals for the shaft.

3. A feed cutter including a frame having slots formed therein, an endless conveyer, a cutter, a relatively stationary roller journaled in the frame, a movable roller co-acting with the stationary roller and provided with a stub shaft extending through the slots in the frame, a stub shaft carried by the stationary roller, spaced bars having slots formed therein for the reception of the stub shafts, sprocket wheels secured to the stub shafts and mounted for rotation between the bars, a power wheel on the cutter shaft for transmitting motion to the lower feed roller, a reel mounted for rotation above the conveyer, a sprocket chain engaging the roller actuating sprockets and operatively connected with the reel and conveyer, respectively, and a tension device for adjusting the slack in the sprocket chain.

4. A feed cutter including a frame, feed rollers mounted for rotation in the frame, a cutter, an endless conveyer including a plurality of transverse slats, pulling teeth secured to each slat for feeding the material to the feed rollers, and stripping teeth secured to each slat and adapted to engage the pulling teeth of a succeeding slat for disengaging the material from said pulling teeth.

5. A feed cutter including a frame, feed rollers mounted for rotation on the frame, a cutter, an endless conveyer including a plurality of transverse slats, a reel mounted for rotation above the conveyer for compressing the material, pulling teeth secured to the slats and extending in the direction of the feed rollers, and rearwardly extending stripping teeth secured to each slat and bearing against the pulling teeth of the succeeding slat for disengaging the material from the pulling teeth.

6. A feed cutter including a frame, a cutter, feed mechanism disposed on one side of the cutter, an endless conveyer, means for rotating the conveyer, feeding devices carried by the conveyer for delivering the material to the feed mechanism, and means separate from and mounted on the conveyer and co-acting with the feeding devices for stripping the material from said feeding devices.

7. A feed cutter including a frame, an endless conveyer mounted on the frame, feed rollers disposed at one end of the endless conveyer, a cutter, brackets secured to the frame, a reel mounted for rotation in the brackets and including spaced heads each formed of intersecting spokes having intermediate braces and connected by longitudinal bars, and means operatively connected with the reel, feed rollers and conveyer for actuating the same.

8. A feed cutter including a frame having a hopper, an endless conveyer mounted for rotation in the hopper, feed rollers disposed at one end of the conveyer, a cutter, adjustable brackets secured to the frame and having elongated slots formed therein, a reel mounted for rotation in the brackets for feeding the material to the rollers, said reel being formed of spaced heads comprising intersecting spokes having intermediate braces and connected by longitudinal bars, and fastening devices passing through the slots in the brackets and engaging the frame for securing the brackets in adjusted position.

In testimony that we claim the foregoing as our own, we have hereto affixed our signatures in the presence of two witnesses.

HENRY C. KRASE.
RICHARD GRIMM.

Witnesses:
WM. PRIEGNITZ,
GEO. H. DICKE.